May 22, 1951 H. J. KUHLMAN 2,554,198
DETACHABLY MOUNTED CORN HARVESTER
Filed Feb. 26, 1947 4 Sheets-Sheet 3

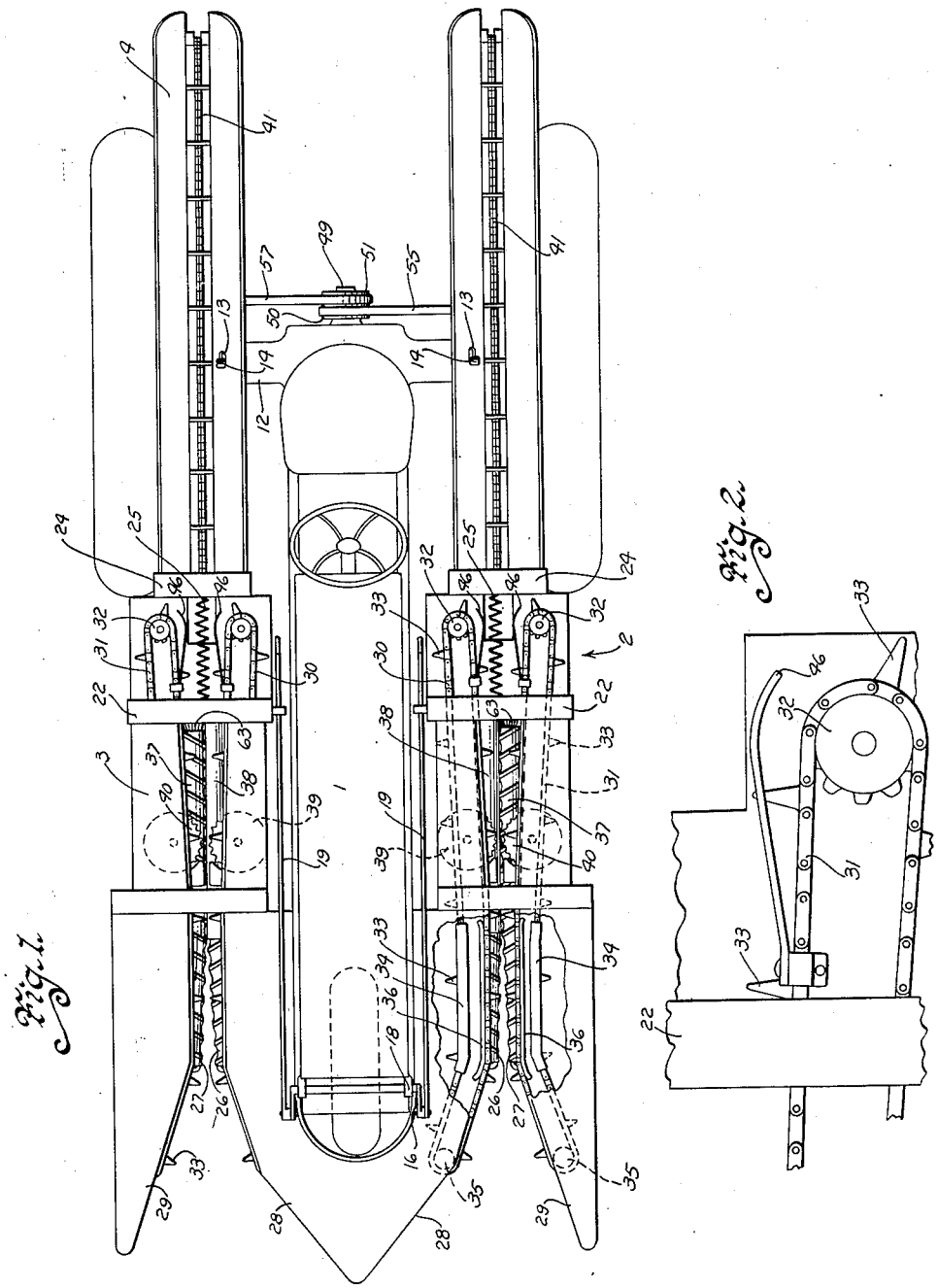

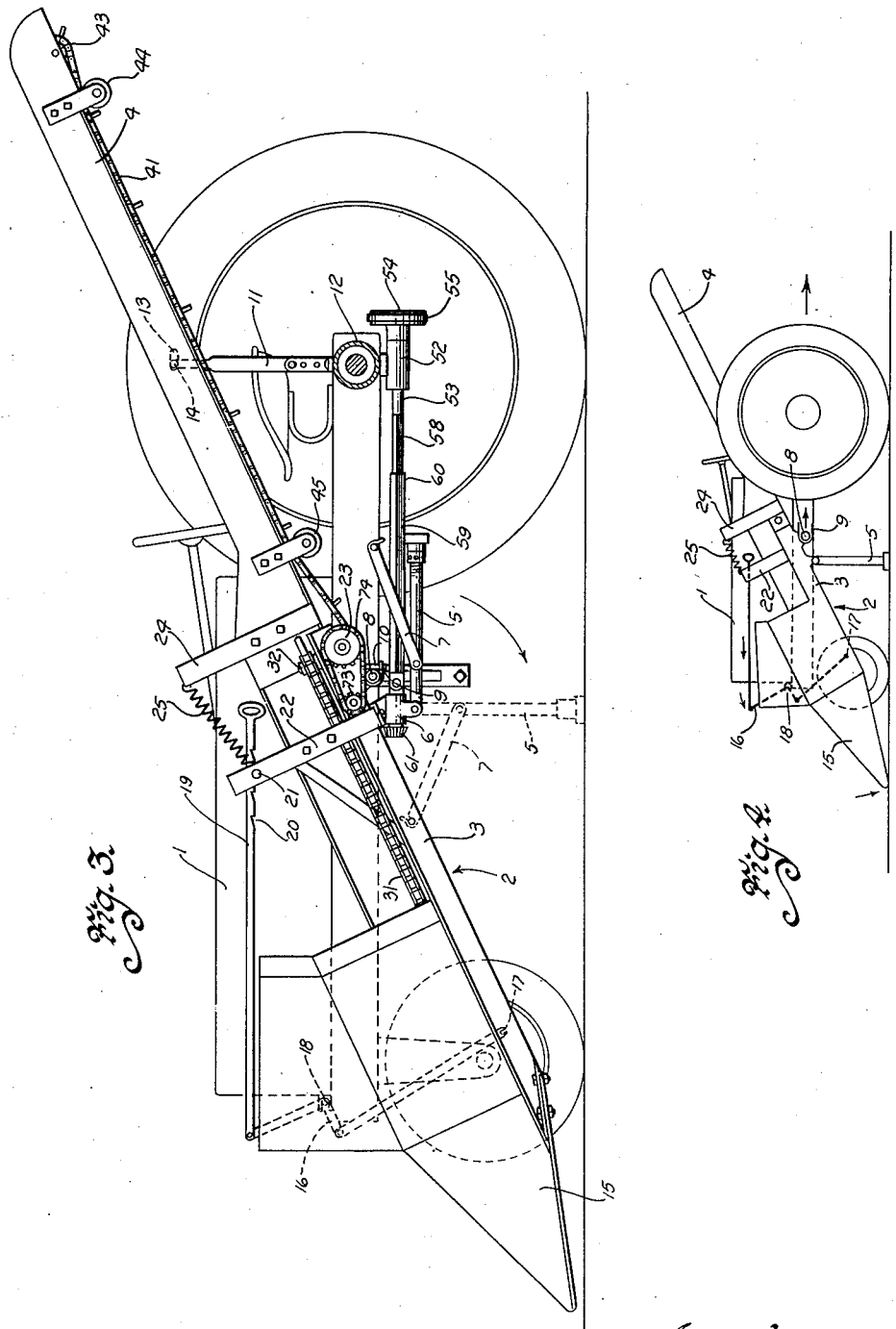

Inventor
Henry J. Kuhlman
by Harry L. Yinger
Attorney

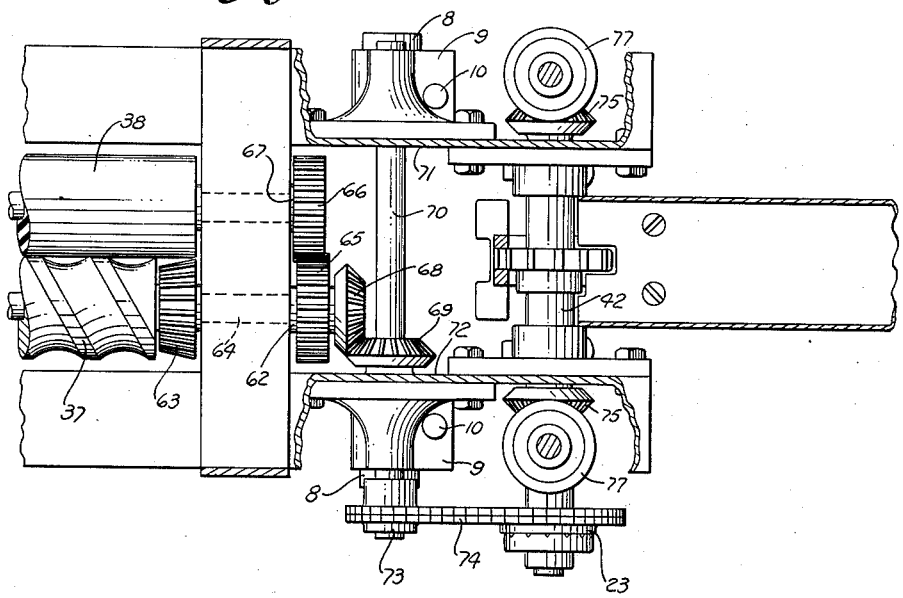
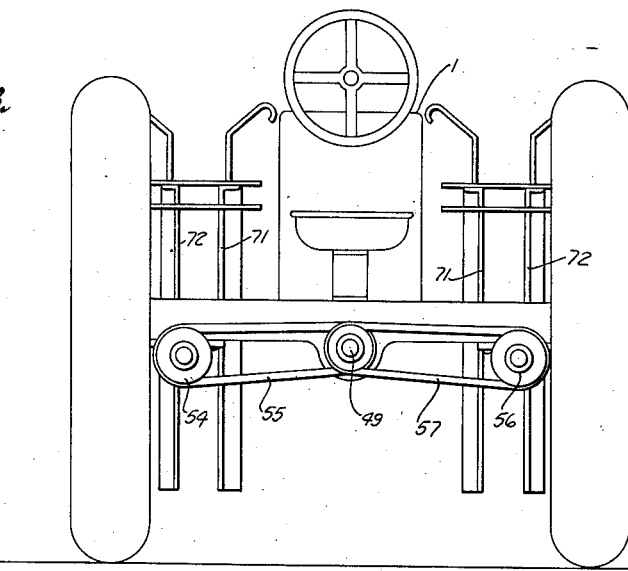

Patented May 22, 1951

2,554,198

UNITED STATES PATENT OFFICE 2,554,198

DETACHABLY MOUNTED CORN HARVESTER

Henry J. Kuhlman, Waterloo, Iowa

Application February 26, 1947, Serial No. 731,012

2 Claims. (Cl. 56—18)

This invention relates to a corn picker and more particularly to a corn picker that can be mounted to and demounted from a farm tractor, either operation being accomplished in a matter of minutes.

Mechanical corn pickers have come into almost universal use for the picking of corn. In some instances, the corn pickers are built around a motive power source and become a unit. In other picker arrangements, the corn picker is adapted to be towed by a tractor so that the tractor does not become a part of the corn picker unit except to furnish power for the operation of the corn picker units. The corn picker arrangement that has the power source included does the job desired, but becomes an expensive unit, in fact too expensive for sale to the general farmer. The pickers that are towed leave much to be desired in that they are cumbersome and unwieldy and require large space for maneuvering. The corn picker that can be mounted on the tractor that is used generally on the farm is to be desired in that the power plant used by the corn picker can be used as a tractor during the portions of the year that corn is not picked. The corn pickers now mountable on tractors perform the job of picking corn in a satisfactory manner but require a day or more and the time of two or three men to mount and dismount the corn picker from a tractor. It is with the problem of perfecting a corn picker that is mounted or dismounted from the general purpose farm tractor in a matter of minutes that the present invention is concerned and in making the corn picker of light weight.

It is an object of the invention among others to provide a corn picker structure that can be mounted or dismounted from a farm tractor in a matter of minutes; a corn picker structure that is supported when free of a tractor in a position that the tractor is driven into the corn picker and the coupling act is more or less automatic only requiring that fastening means be secured in the coupling portions of the tractor and corn picker; a corn picker made light in weight which accomplishes the corn picking job and allows the corn picker to be sold at a low price; a corn picker supported when free of a tractor in such position that when the tractor is driven into the corn picker a power take-off from the tractor will automatically couple into power transmission means on the corn picker with no further effort needed upon the part of those coupling the two members together; a corn picker structure made up of a snapping and husking section and an elevator section with the elevator section directly behind the snapping and husking section and hence a wagon to collect the picked corn directly behind the tractor in order that the tractor has a direct pull on the wagon and the whole assembly making a compact unit so as to be easily maneuvered; a corn picker mechanism having a simple and compact power transmission, easily accessible in case of repair; a corn picker mechanism having gathering conveyors flared outwardly at the bottom of the snapping and husking section and guided in their travel, and mounted to allow turning of the front wheels of the tractor to give a greater gathering area for a gathering chain; a corn picker wherein the gathering chain is cleaned of husks that adhere thereto each revolution of the chain to prevent plugging of the chain and breaking thereof; a corn picker simple in construction and operation, easy to operate and economical both in construction and operation; a corn picker that is long lasting and more durable in operation, requiring less repair and lost time in operation; a corn picker that is easy to operate, simple in design and easy of repair in case of breakdown; a corn picker requiring no special skill on the part of an operator to mount on a tractor; and a corn picker that can be supplied and operated at a much lower cost than anything on the market at present.

In carrying out the objects of the invention there is provided a corn picker mechanism quickly mounted on and demounted from a tractor with the corn picker having a snapping and husking section and an elevator section. There are means to couple the corn picker mechanism to the tractor which may be a socket means on each side of the corn picker receiving projecting coupling members from each side of the tractor to couple the tractor and corn picker together. There are means on the corn picker mechanism to support the corn picker mechanism in a position to receive the tractor when uncoupled from the tractor and said tractor is driven into the corn picker mechanism for coupling the tractor to the corn picker mechanism. The supporting means may be a pair of movable supporting members on each side of the corn picker mechanism and the supporting members are moved into inoperative position when the corn picker mechanism is assembled to the tractor. The snapping and husking section and elevator section are pivotally connected together and there are means connected with the snapping and husking section which may be a toggle means, to pivot the snapping and husking section about the elevator section to space the lower end of the snapping and husking section from the ground. There is also included a support member between the elevator and tractor to hold the elevator in a set position when assembled and a spring between the snapping and husking section and the elevator section to hold the elevator section in an upward position on the snapping and husking section when the corn picker mechanism is disassembled from the tractor.

The tractor has a power take-off extending from the tractor to operate the snapping and husking section and elevator section which power take-off from the tractor aligns with a socket on the corn picker mechanism when the tractor is driven into the corn picker mechanism to couple the power from the tractor to the corn picker mechanism. The corn picker has a rod having a socket portion into which the power-take-off from the tractor couples to transmit power from the tractor to the snapping and husking section and elevator section. One of the snapping and husking rollers has a gear on the upper end thereof which meshes with a gear on the end of the rod carrying the socket to transmit power to the snapping and husking roller. There is also a gear transmission means connected with the snapping and husking roller to convey power to the elevator section and other portions of the snapping and husking section. A conveyor is included on each side of the snapping and husking rollers and is connected with the power transmission means. The said conveyors are guided outwardly at their lower ends on their downward travel and guided inwardly on their upward travel.

The conveyor in the corn picker mechanism is an endless gathering chain having prongs extending therefrom and running along the snapping and husking sections with the prongs moving the corn into and along the snapping and husking sections. A means is attached to the corn picker mechanism, which may be spring fingers on either side of the prongs, through which the prongs pass and the spring fingers wipe the prongs clean of any corn shucks adhering thereto.

With the foregoing and other objects in view, the invention will be more fully described herewith and will be particularly pointed out in the claims appended hereto.

In the drawings, wherein like symbols refer to like or corresponding parts throughout the several views:

Figure 1 is a plan view showing the corn picker mechanism mounted on a tractor.

Figure 2 is an enlarged plan view showing the upper end of one conveyor within the snapping and husking section.

Figure 3 is an elevational view showing one side of the corn picker mechanism mounted on a tractor.

Figure 4 is a schematic view indicating the tractor being uncoupled from the corn picker mechanism.

Figure 7 is an enlarged top plan view with covering parts removed to show the power transmission means from the snapping and husking roller to the other portions of the snapping and husking section and elevator section.

Figure 8 is a rear elevational view showing a tractor and the means of carrying the power from the tractor to the corn picker mechanism.

Figure 5:
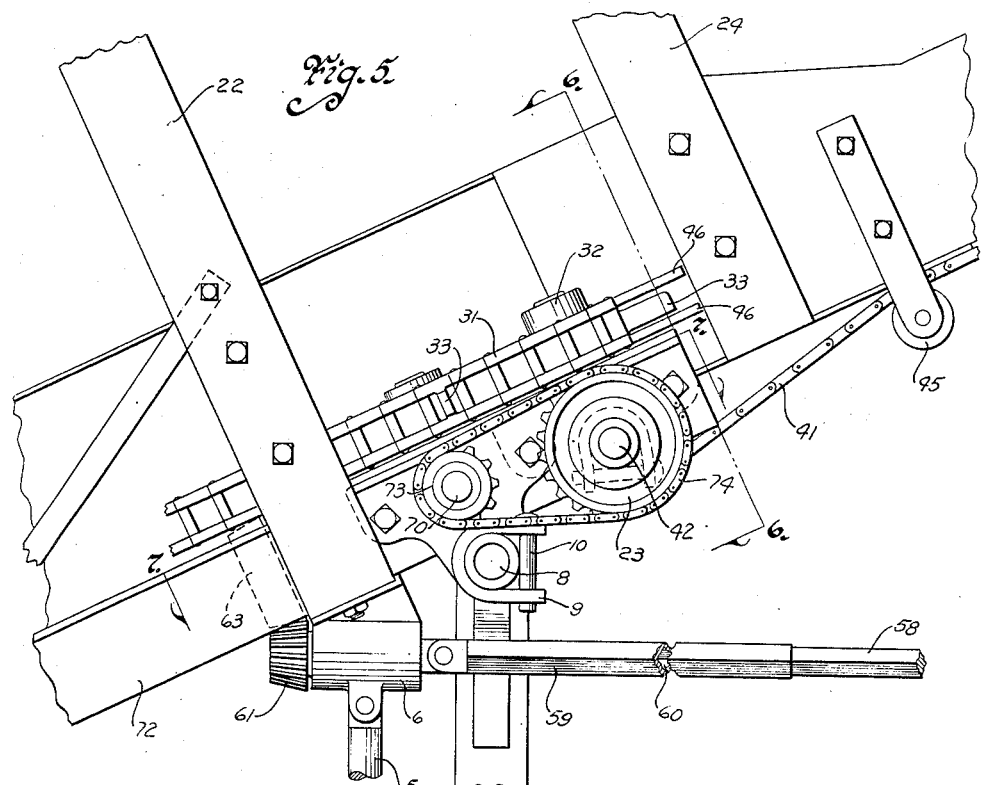
Figure 5 is an enlarged side elevational view showing the upper end of the snapping and husking section, the lower end of the elevator section and the power transmission hook-up between the tractor and corn picker mechanism.

A general farm tractor is represented at 1 with a corn picker mechanism 2 comprising a snapping and husking section 3 and an elevator section 4 mounted on the tractor as shown in Figure 1. As shown in Figure 3, the snapping and husking section 3 of the corn picker mechanism carries a supporting strut 5 on each side of the corn picker mechanism 1 that is movably or pivotally connected to member 6. In solid line in Figure 3, the strut 5 is shown in inoperative position, being folded back and held in inoperative position by the bracket member 7. The dotted line position of Figure 3 shows the strut 5 contacting the ground and bracket member 7 hooking over the snapping and husking section 3 to build the strut 5 in a vertical position to support the corn picker mechanism 2 when removed from the tractor 1.

The corn picker structure is ideally adapted for a two row picker and is supported and operated from each side of the tractor 1. When the tractor 1 is removed from the corn picker mechanism 2, the corn picker mechanism 2 is supported by the struts 5 in a position that the tractor 1 can be driven into the corn picker mechanism 2 with coupling means on each member meshing and aligning so the corn picker mechanism 2 is supported by the coupling members and the two are held together by the coupling means after the struts 5 are folded to the inoperative position shown in Figure 3. A projection 8 extends from each side of the tractor 1 and the corn picker mechanism 2 has U-bolt members 9 which form socket members to receive the projections 8. The corn picker mechanism 2 is supported by the struts 5 so that the socket members 9 are at the right height to receive the projections 8 when the tractor is driven into the corn picker mechanism 2 or as shown in Figure 4, at the proper height so that the tractor may be backed from the corn picker mechanism 2 and uncoupled therefrom. A pin 10 extends across the open end of the U-belt 9 to lock the projections 8 pivotally in the sockets 9 when the corn picker mechanism 2 is assembled to the tractor 1. A supporting member 11 is attached to the axle housing 12 of the rear axle of the tractor 1 and supports the elevator section 4 at the proper angle to deliver corn into a towed wagon. The supporting members 11 may be hinged or attached in any manner to the rear axle housing 12 of the tractor 1 so they may be removed or collapsed out of the way when the tractor is to be used for other purposes. A slot 13 in each elevator section 4 receives the projecting end 14 of the supporting member 11. It can therefore be seen that to couple the corn picker mechanism 2 to the tractor 1, all that is necessary is to drive the tractor 1 into the corn picker mechanism 2 supported on the struts 5 until projections 8 fit into V-bolts 9 after which pins 10 are dropped into place to hold the tractor 1 and corn picker mechanism 2 locked together and to raise supports 11 to enter the ends 14 into slots 13 in the elevator section 4. The whole coupling operation can be carried out in a matter of minutes as can readily be seen from the simple operations necessary.

The front ends 15 of the snapping sections 3 are resting on the ground as shown in Figure 4 when the tractor 1 is coupled or uncoupled from the corn picker mechanism 2. After coupling the corn picker mechanism to the tractor 1 it is necessary to lift the front ends of the snapping and husking sections 3 off the ground before the unit can move forwardly. A toggle mechanism 16 has one end portion 17 pivotally connected with the end portion 15 of the snapping and husking section 3 and connected with another portion of the toggle pivotally connected to the front of the tractor 1 at 18. A handle portion 19 of the toggle 16 can be grasped by the tractor driver from the tractor seat to raise or lower the snapping and husking section end portion 15 and notches 20 on the handle portion 19 seat over pin 21 in a bracket 22 to hold the toggle mechanism 16 and lower portion 15 in any position determined by the operator.

The snapping and husking section 3 and elevator section 4 forming the corn picker mechanism are pivotally held together about a sprocket shaft 42 attached to wheel 23 and when the elevator section 4 is supported on the tractor 1, the supporting members 11 support the elevator section 4. When the corn picker mechanism 2 is removed from the tractor 1 and supported on struts 5 the elevator section 4 no longer has the support 11. A bracket member 24 is attached to the elevator section 4 and lies parallel to bracket member 22. A spring 25 connects between the bracket members 22 and 24 and holds the elevator section 4 from pivoting about the shaft 42 attaching to sprocket wheel 23.

The snapping and husking section 3 has snapping rollers 26 and 27 which rotate in the usual manner to snap an ear of corn from a stalk of corn. The stalk of corn is guided into the snapping rollers 26 and 27 by the walls 28 and 29 on the front end of the picker mechanism 1 after which a gathering chain mechanism pulls the corn stalk into the snapping rollers 26 and 27. The gathering chain comprises an endless chain 30 and 31 on each side of the snapping rollers 26 and 27. At the top of the snapping and husking section 3, the chain passes over a sprocket wheel 32, using the outside chain 31 for illustrative purposes in describing the functioning of the gathering chains. The chain 31 has prongs 33 extending therefrom to contact and gather corn stalks into the snapping rollers 26 and 27. The chain 31 moves upwardly on the inside and downwardly on the outside of snapping rollers 26 and 27. On the outside travel of the gathering chain 31 is a guide member 34 through which the chain passes and is directed outwardly at an angle to follow the direction of the wall 29. About halfway along the wall 29 is a sprocket wheel 35 about which the chain 31 turns and runs along the edge of wall 29 until it reaches guide member 36 where the chain 31 is guided to follow snapping roller 27 and advance a corn stalk into the snapping rollers 26 and 27 and carry the corn snapped from the stalk upwardly over husking rollers 37 and 38. The husking rollers 37 and 38 are extensions of snapping rollers 26 and 27 and rotate therewith and the snapping rollers 26 and 27 and husking rollers 37 and 38 function the same as in corn pickers now in use. There is incorporated with the husking rollers rotating discs 39 and 40 to puncture and tear the husk remaining on an ear of corn so the husking rollers 37 and 38 have something to grasp in removing the husk from the ear of corn. The flaring out of the gathering chains 20 and 31 at the bottom of the snapping and husking section 3 allows a larger gathering area for the corn picker mechanism 2. The limiting factor in the amount of outward flaring is the front wheel of the tractor. If flared too much the front wheel of the tractor may be caught by the prongs 33 on the inner gathering chain 30. The present structure allows considerable flaring without interfering with the front wheel of the tractor.

Figure 6:
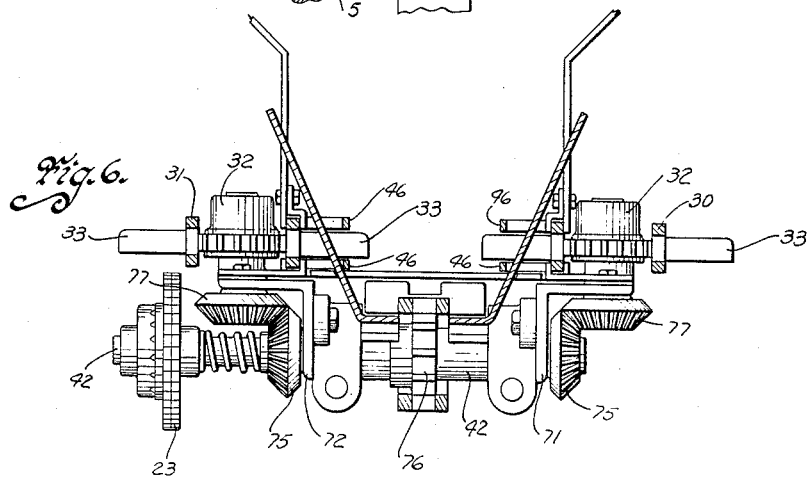
Figure 6 is a sectional view through the line 6—6 of Figure 5.

The chains 30 and 31 advance the corn upwardly until it is discharged on to the elevator chain 41 running the length of the elevator section 4. The elevator chain 41 passes over a shaft 42 (Figure 6) which has sprocket wheel 23 on one end thereof. The chain 41 passes upwardly over sprocket wheel 43 and returns downwardly with rollers 44 and 45 guiding the chain 41 in its downwardly motion. The upper end of the elevator section 4 extends over a wagon (not shown) and delivers the corn into the wagon.

At the upper end of the gathering chains 30 and 31 is located wiper or cleaner means shown generally at 46 (Figure 2) attached in any suitable manner to the corn picker mechanism 2 and may comprise two spring arms through which the prongs 33 pass in their upward travel so that any corn shucks adhering to the prongs 33 on the gathering chains will be wiped off the prongs to keep the corn shucks from building up on the chains to the point the the gathering chains become jammed and break.

Turning now to Figure 8, a power take-off 49 extends outwardly from the rear of the tractor 1 and connects with the main shaft of the tractor 1 as a motive power means for transmitting power to the snapping and husking section 3 and the elevator section 4 of the corn picker mechanism 2. The power take-off shaft 49 has two pulleys 50 and 51 connected and movable with the shaft 49. At each side of the tractor 1 and connected to the under side of the rear axle housing 12 is a bearing portion, one of which is shown at 52 to receive a shaft 53. The shaft 53 has a pulley 54 attached to the rear end thereof and a V-belt 55 connects over the pulley 51 and pulley 54 to transmit power to the shaft 53 from the tractor 1. A pulley 56 is at the other side of the tractor 1 and a V-belt 57 connects power from the tractor 1 to the other side of the tractor 1. The tractor 1 may have a suitable clutch means so that that power take-off 49 does not operate every time the tractor engine starts, but the transmission of power to the snapping and husking section 3 and the elevator section 4 may be controlled by the driver of tractor 1.

The shaft 53 is square on the end thereof as shown at 58. A shaft 59 extends from the corn picker mechanism 2 and is journaled in member 6 which serves as a bearing for the rotation of shaft 59. The shaft 59 extends toward the rear of the corn picker mechanism 2 and provides a socket portion 60 on the end thereof. When the corn picker mechanism 2 is supported by the strut 5 as shown in Figure 4 and it is desired to couple the corn picker mechanism 2 and tractor 1 together as previously described, the socket portion 60 of shaft 59 will be supported in such a position as to receive the shaft 58 into the socket 60 as the tractor 1 is driven into the corn picker mechanism 2. It can be seen that the power from the tractor 1 will be coupled to transmission means on each side of the tractor 1 by coupling tractor 1 to the corn picker mechanism 2 and nothing further need be done to couple the power since the shaft 53 has a square end 58 which couples into a square socket 60. Hence the power is coupled into the corn picker mechanism 2 by guiding a power transmission shaft 53 carried by the tractor into a receiving socket 60 carried on the corn picker mechanism 2. Either the shaft 59 or shaft 53 can be made movable to allow for adjustment in case the two shafts do not align as the tractor 1 is driven into the corn picker mechanism 2.

The shaft 59 has a bevel gear 61 on the end thereof which meshes with a bevel gear 63 attached on the shaft 62 carrying the husking roller 37 and said beveled gears 61 and 63 serve to rotate husking roller 37 and snapping roller 27 when power is transmitted from the tractor 1 through shafts 53 and 59. The bevel gear 63 is located on one side of the bearing surface 64 for the shaft 62 and a spur gear 65 is located on the other side of the bearing on shaft 62. The spur gear 65 meshes with spur gear 66 attached to the end of shaft 67 to which husking roller 38 and snapping roller 26 are connected so that the snapping rollers 26 and 27 and husking rollers 37 and 38 will rotate at the same time when power is furnished from the tractor 1.

A bevel gear 68 is on the end of shaft 62 and connects with a bevel gear 69 mounted on a shaft 70 journaled in members 71 and 72 which are parts of the snapping and husking section 3. The power from tractor 1 is transmitted through gears 68 and 69 to rotate shaft 70. A sprocket 73 is attached to the end of shaft 70 outside the snapping and husking section 3. A second shaft 42 previously mentioned parallel to the shaft 70 and spaced therefrom is also journaled in the members 71 and 72 of the snapping and husking section 3. The shaft 42 has a larger sprocket wheel 23 on the end thereof and on the same side of the snapping and husking section 3 as the sprocket 73. A sprocket chain 74 connects the sprocket wheels 73 and 23 and motion is transmitted from sprocket wheel 73 through chain 74 to sprocket wheel 23 and thence to shaft 42.

The shaft 42 has a bevel gear 75 on the shaft on one end meshing with a bevel gear 77 connected to sprocket wheel 32 to rotate sprocket wheel 32 and hence chain 31. On the other end of the shaft 42 is a similar beveled gear arrangement to rotate the chain on the other side of the snapping and husking section 3 in a like manner. In the middle of shaft 42 is a sprocket wheel 76 over which the elevator chain 41 passes and is rotated to actuate the elevator section 4. It can thus be seen that after the power from tractor 1 is coupled into the corn picker mechanism, a power transmission set-up is provided that transmits power to every part of the corn picker mechanism 2.

No effort has been made to describe the parts of the corn picker mechanism 2 that cover the working parts. It is to be understood that the corn picker mechanism 2 is suitably covered with sheet metal or any other material suitable for covering purposes and is streamlined for appearance.

It will be understood that the invention has been described for purposes of illustration and explanation and that changes and variations are possible without departing from the scope of the invention; all such modifications and changes are intended to be included in the appended claims.

I claim:

1. In a means for simultaneously coupling a corn picker to a tractor and the corn picking mechanism to the power take-off of the same tractor, a frame member, a corn picking mechanism mounted on said frame, a U bolt member secured to each side of said frame member; each of said U bolts designed to receive a projection on the respective sides of a tractor, a locking means on said U bolts to retain the projections therein, a shaft member on each side of said frame member; each shaft having its forward end operatively associated with said corn picking mechanism and each shaft extending rearwardly from said frame, a square socket portion on the rear end of each shaft; each of said socket designed to receive a square end shaft that is operatively associated with the power take-off of a tractor, a strut member movably mounted on said frame member and in its operable position capable of keeping said U bolts and shafts on said corn picking mechanism in such a position that when a tractor is driven into engagement with said frame said U bolts will receive the projections on the tractor and the sockets on the shafts associated with the corn picking mechanism will receive shafts associated with the power take-off of the tractor, thereby operatively associating the corn picking mechanism with the power take-off of the tractor without any other coupling means and at the same time attaching the corn picking frame to the tractor.

2. In an attaching means for use in connecting a corn picker to a tractor; said corn picker comprising a U-shaped frame designed to embrace the front and two sides of the tractor and provided with a slot on each rearwardly portion of its free ends and a corn picking mechanism mounted on said frame, said attaching means comprising, two horizontal projections designed respectively to be disposed on opposite sides of a tractor and secured thereto, two U bolt members respectively designed to be secured to the respective sides of said frame; said U bolts each capable of receiving one of said projections when the tractor is driven into engagement with said frame, locking means on said U bolts to retain said projections therein, thereby attaching said frame to the tractor, two support arms respectively, designed to be hingably secured at one end to one side of the tractor and at its other end capable of being detachably secured in one of the slots in said frame member, two bearing members designed to be secured respectively to each rear side of a tractor, a shaft member mounted in each bearing member and extending forwardly therefrom, the rear of each of said shafts designed to be operatively associated with the power take-off on the tractor, the forward end portion of each of said shafts being square, two second shaft members designed to be disposed on each side of said corn picker frame and further designed to have their respective forward ends operatively associated with the corn picking mechanism; said second shafts extending rearwardly from said mechanism, a square sockekt portion on the rear end of each second shaft; each of said socket portions respectively capable of receiving the forward end of one of said first mentioned shafts when the tractor is moved into engagement with the corn picker, and a strut member movably mounted on said frame member and in its operable position capable of keeping said U bolts and shafts on said corn picking mechanism in such a position that when a tractor is driven into engagement with said frame said U bolts will receive the projections on the tractor and the sockets on the shafts associated with the corn picking mechanism will receive shafts associated with the power take-off of the tractor, thereby operatively associating the corn picking mechanism with the power take-off of the tractor without any other coupling means and at the same time attaching the corn picking frame to the tractor.

HENRY J. KUHLMAN.

REFERENCES CITED

The following references are of record in the file of this patent:

UNITED STATES PATENTS

| Number | Name | Date |
|---|---|---|
| Re. 22,279 | Hyman et al. | Mar. 2, 1943 |
| Re. 22,991 | Hitchcock et al. | Mar. 23, 1948 |
| 1,504,768 | Laminack | Aug. 12, 1924 |
| 1,748,151 | Stehling | Feb. 25, 1930 |
| 1,943,284 | Binau | Jan. 16, 1934 |
| 2,259,892 | Hyman | Oct. 21, 1941 |
| 2,293,757 | Jochumsen | Aug. 25, 1942 |